(12) United States Patent
Tsujii et al.

(10) Patent No.: US 11,407,849 B2
(45) Date of Patent: Aug. 9, 2022

(54) METHOD FOR MANUFACTURING GRAFT POLYMER, GRAFT POLYMER, AND INITIATOR OF GRAFT POLYMER

(71) Applicants: KYOTO UNIVERSITY, Kyoto (JP); NANYANG TECHNOLOGICAL UNIVERSITY, Singapore (SG); GODO SHIGEN CO., LTD., Tokyo (JP)

(72) Inventors: Yoshinobu Tsujii, Kyoto (JP); Keita Sakakibara, Kyoto (JP); Atsushi Goto, Singapore (SG); Michihiko Miyamoto, Chiba (JP); Hiroto Komatsu, Chiba (JP); Takuya Jitsukawa, Chiba (JP)

(73) Assignees: KYOTO UNIVERSITY LTD.; GODO SHIGEN CO., LTD, Tokyo (JP); NANYANG TECHNOLOGICAL UNIVERSITY, Singapore (SG)

( * ) Notice: Subject to any disclaimer, the term of this patent is extended or adjusted under 35 U.S.C. 154(b) by 379 days.

(21) Appl. No.: 16/490,202

(22) PCT Filed: Mar. 1, 2018

(86) PCT No.: PCT/JP2018/007707
§ 371 (c)(1),
(2) Date: Aug. 30, 2019

(87) PCT Pub. No.: WO2018/159740
PCT Pub. Date: Sep. 7, 2018

(65) Prior Publication Data
US 2021/0163656 A1 Jun. 3, 2021

(30) Foreign Application Priority Data
Mar. 2, 2017 (JP) .................. 2017-039800

(51) Int. Cl.
| | | |
|---|---|---|
| *C08F 293/00* | (2006.01) | |
| *C08F 220/18* | (2006.01) | |
| *C08F 2/38* | (2006.01) | |
| *C08F 8/18* | (2006.01) | |
| *C08F 265/06* | (2006.01) | |

(52) U.S. Cl.
CPC ............ *C08F 293/005* (2013.01); *C08F 2/38* (2013.01); *C08F 8/18* (2013.01); *C08F 220/1806* (2020.02); *C08F 265/06* (2013.01); *C08F 2438/00* (2013.01)

(58) Field of Classification Search
CPC ............ C08F 292/005; C08F 220/1806; C08F 2/38; C08F 8/18; C08F 265/06; C08F 2438/00
USPC ...................................................... 526/193
See application file for complete search history.

(56) References Cited

U.S. PATENT DOCUMENTS

| | | | |
|---|---|---|---|
| 5,789,487 A | 8/1998 | Matyjaszewski et al. | |
| 5,945,491 A | 8/1999 | Matyjaszewski et al. | |
| 6,111,022 A | 8/2000 | Matyjaszewski et al. | |
| 6,124,411 A | 9/2000 | Matyjaszewski et al. | |
| 6,162,882 A | 12/2000 | Matyjaszewski et al. | |
| 7,732,549 B2 | 6/2010 | Aoyagi et al. | |
| 8,742,045 B2 * | 6/2014 | Goto .................. | C08F 4/40 526/206 |

(Continued)

FOREIGN PATENT DOCUMENTS

| | | |
|---|---|---|
| EP | 0966489 A1 | 12/1999 |
| EP | 1688440 A1 | 8/2006 |

(Continued)

OTHER PUBLICATIONS

Lei et al. "Systematic Study on Alkyl Iodide Initiators in Living Radical Polymerization with Organic Catalysts", Macromolecules, 2014, vol. 47, No. 19, pp. 6610-6618 (Year: 2014).*
International Search Report (ISR) dated May 15, 2018 issued in International Application No. PCT/JP2018/007707.
Written Opinion dated May 15, 2018 issued in International Application No. PCT/JP2018/007707.
Lei et al., "Systematic Study on Alkyl Iodide Initiators in Living Radical Polymerization with Organic Catalysts," Macromolecules, 2014, vol. 47, No. 19, pp. 6610-6618.

(Continued)

*Primary Examiner* — Michael M. Bernshteyn
(74) *Attorney, Agent, or Firm* — Holtz, Holtz & Volek PC

(57) ABSTRACT

A method for manufacturing a graft polymer, that ensures more stable progress of a living radical polymerization by using a monomer structural unit containing an iodine initiating group as an initiator, includes performing a living radical polymerization of a compound with a vinyl monomer by an organic catalyst to manufacture the graft polymer. The compound has a recurring unit represented by a formula (1) below in a main chain:

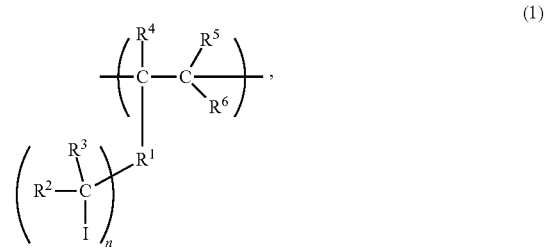

(1)

where, $R^1$: linking group (linear, branched, or cyclic alkylene group having 1 to 30 carbon atoms that may contain an ether bond, an amide bond, or an ester bond, an aromatic group), $R^2$, $R^3$, $R^4$, $R^5$, $R^6$: an aromatic group, an aliphatic group, a hydrogen atom, an aliphatic group, and n=1 to 5.

6 Claims, No Drawings

(56) References Cited

U.S. PATENT DOCUMENTS

| | | | | |
|---|---|---|---|---|
| 2010/0173223 A1* | 7/2010 | Takagi | ............... | C08F 291/04 |
| | | | | 429/492 |
| 2011/0124832 A1* | 5/2011 | Goto | ............... | C08F 293/005 |
| | | | | 526/204 |
| 2015/0038643 A1 | 2/2015 | Hishikawa et al. | | |
| 2016/0347872 A1* | 12/2016 | Goto | ............... | B01J 27/138 |
| 2019/0002619 A1 | 1/2019 | Shimanaka et al. | | |

FOREIGN PATENT DOCUMENTS

| | | | | | |
|---|---|---|---|---|---|
| EP | 1688440 A1 | * | 8/2006 | ........... | C08F 12/16 |
| JP | H10139829 A | * | 5/1998 | | |
| JP | 2000302823 A | * | 10/2000 | | |
| JP | 2000302823 A | | 10/2000 | | |
| JP | 2004018556 A | | 1/2004 | | |
| JP | 2013213008 A | | 10/2013 | | |
| JP | 2013213144 A | | 10/2013 | | |
| JP | 2014117672 A | | 6/2014 | | |
| JP | 2015199834 A | | 11/2015 | | |
| JP | 2015199834 A | * | 11/2015 | | |
| JP | 2015227407 A | * | 12/2015 | | |
| JP | 2015227407 A | | 12/2015 | | |
| WO | 9801480 A1 | | 1/1998 | | |
| WO | WO-9801480 A1 | * | 1/1998 | ........... | C08F 4/10 |
| WO | 2017150287 A1 | | 9/2017 | | |

OTHER PUBLICATIONS

Extended European Search Report (EESR) dated Oct. 28, 2020, issued in European Application No. 18760480.6.

Supplementary European Search Report dated Nov. 17, 2021, issued in European Application No. 18760480.6.

Written Opinion and Search Report dated Jan. 12, 2021, issued in Singaporean Application No. 11201907718T.

Written Opinion dated Nov. 10, 2020, issued in Singaporean Application No. 11201907718T.

Kowalczuk-Bleja, et al., "Controlled radical polymerization of p-(iodomethyl)styrene-a route to branched and star-like structures", Polymer, vol. 45, No. 1 (2004), pp. 9-18.

Teodorescu, et al., "Grafting styrene onto poly(vinyl acetate) by free radical chain transfer reactions", Reactive & Functional Polymers vol. 61 (2004) pp. 387-395.

* cited by examiner

METHOD FOR MANUFACTURING GRAFT POLYMER, GRAFT POLYMER, AND INITIATOR OF GRAFT POLYMER

TECHNICAL FIELD

The present invention relates to a method for manufacturing a graft polymer, the graft polymer manufactured with the manufacturing method, and an initiator of the graft polymer to manufacture the graft polymer by using a low-price and stable organic catalyst to the initiator having a monomer structural unit containing an iodine initiating group to easily perform living radical polymerization.

BACKGROUND ART

Recently, various kinds of highly-functional materials have been developed based on a precise control of a polymer structure. Especially, the use of high reactivity of radical polymerization ensures a wide variety of vinyl monomer polymerization, and development of more innovative functional materials has been achieved.

Especially living radical polymerization among the radical polymerizations is a polymerization reaction that reversibly generates a radical species from a stable covalent bond species. Since a process of the living radical polymerization includes only an initiation reaction and a growth reaction without a chain transfer reaction, polymers each having an identical length are obtained, and moreover, since the living radical polymerization process does not include a side reaction that inactivates a growth terminal of an initiator, the growth terminal continues to grow during the polymerization and polymers as though they are alive can be generated. That is, this living radical polymerization has excellent characteristics of the respective living polymerization and radical polymerization together, and can be used for the development of high-polymer materials having more advanced functions.

Incidentally, in such a living radical polymerization, as a transition metal catalyst and a radical initiator, a peroxide that is danger and has difficulty in synthesis is forced to be used in some cases. In view of this, to progress the living radical polymerization safely and easily, it is necessary to bring a low-price and stable organic catalyst into contact with the polymer as the initiator having a recurring unit in a main chain.

Conventionally, for example, techniques described in Patent Documents 1 and 2 are disclosed as the techniques for the living radical polymerization of the polymer that has a chemical structure containing an initiating group as the recurring unit.

Patent Document 1: JP-A-2004-18556
Patent Document 2: JP-A-2014-117672

DISCLOSURE OF THE INVENTION

Problems to be Solved by the Invention

In manufacturing a graft polymer by progressing this living radical polymerization, more stably progressing the living radical polymerization is especially required. While it can be expected in theory that the use of a monomer structural unit containing an iodine initiating group allows more stable progress of the living radical polymerization, the above-described techniques in Patent Documents 1 and 2 do not especially disclose a technique that uses a polymer having the monomer structural unit containing the iodine initiating group as the recurring unit as the initiator, and such a technique has not been inspected also in disclosures other than Patent Documents 1 and 2 in the present situation.

Therefore, the present invention has been invented in consideration of the above-described problems and an object of the present invention is to provide a method for manufacturing a graft polymer, the graft polymer manufactured with the manufacturing method, and an initiator of the graft polymer that ensures more stable progress of a living radical polymerization by using a monomer structural unit containing an iodine initiating group as the initiator.

Solutions to the Problems

The inventors seriously examined to progress the living radical polymerization using the monomer structural unit containing the iodine initiating group as the initiator. As a result, it was found that the use of a compound having a recurring unit represented by the following formula (1) in a main chain as an initiator ensured more stable progress of a living radical polymerization to manufacture a graft polymer.

That is, a method for manufacturing a graft polymer according to a first invention includes performing a living radical polymerization of a compound with a vinyl monomer by an organic catalyst to manufacture the graft polymer, the compound having a recurring unit represented by a formula (1) below in a main chain.

[Chem. 1]

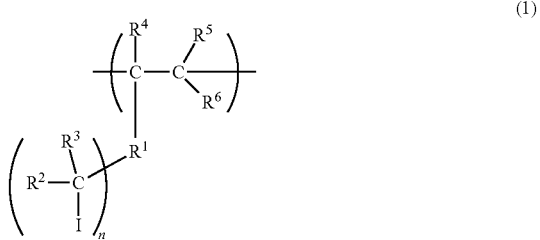

Here, $R^1$: a linking group (linear, branched, or cyclic alkylene group having 1 to 30 carbon atoms that may contain an ether bond, an amide bond, or an ester bond, an aromatic group)

$R^2$, $R^3$, $R^4$, $R^5$, $R^6$: a hydrogen atom, an aromatic group, an aliphatic group n=1 to 5

In the method for manufacturing the graft polymer according to a second invention, the living radical polymerization is performed with the organic catalyst containing any of an amine compound, a phosphine compound, a phosphonate compound, a phosphonium salt, an iodoimido compound, or an ammonium compound.

A graft polymer according to a third invention is manufactured with the method for manufacturing the graft polymer according to the first or the second invention.

An initiator of a graft polymer according to a fourth invention is used as an initiator for a living radical polymerization with a vinyl monomer in the method for manufacturing the graft polymer according to the first or the second invention. The initiator of the graft polymer has the recurring unit represented by the formula (1) below in the main chain.

[Chem. 2]

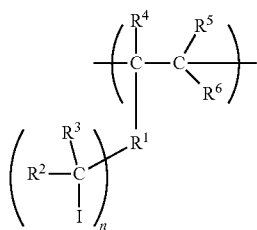

(1)

An initiator of a graft polymer according to a fifth invention is used as an initiator for a living radical polymerization with a vinyl monomer by an organic catalyst. The initiator of the graft polymer has a recurring unit represented by a formula (1) below in a main chain.

[Chem. 3]

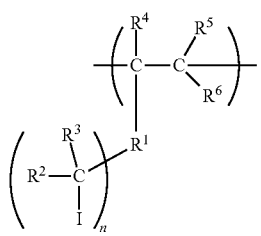

(1)

Here, $R^1$: —COO—$(CH_2)_a$OCO—
$R^2$, $R^3$, $R^4$, $R^5$, $R^6$: a hydrogen atom, an aliphatic group
a=2 to 5

Effects of the Invention

The present invention having the above-described structures ensures the stable progress of the living radical polymerization, and eventually ensures the stable manufacture of the graft polymer.

DESCRIPTION OF PREFERRED EMBODIMENTS

The following describes a method for manufacturing a graft polymer according to the embodiment of the present invention in detail.

In the method for manufacturing the graft polymer to which the present invention is applied, a compound having a recurring unit represented by a formula (1) in a main chain is living-radical-polymerized with a vinyl monomer by an organic catalyst.

[Chem. 4]

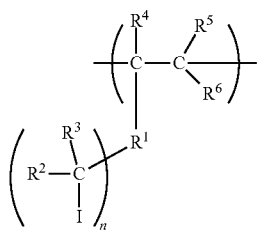

(1)

Here, $R^1$ is a linking group. Especially this $R^1$ is a linear, branched, or cyclic alkylene group having 1 to 30 carbon atoms that may contain an ether bond, an amide bond, or an ester bond, an aromatic group. $R^2$, $R^3$, $R^4$, $R^5$, and $R^6$ are a hydrogen atom, the aromatic group, an aliphatic group, or the like, and n=1 to 5 is satisfied.

It is a premise for this compound as the initiator that structural units having iodine initiating groups are continuous.

The vinyl monomer (radically polymerizable monomer) reacted with such a compound represented by the formula (1) as the initiator is a monomer that can perform a radical polymerization in the presence of an organic radical and has an unsaturated bond. That is, in a polymerization method of the present invention, any monomer conventionally publicly-known to perform the living radical polymerization can be used.

More specifically, a monomer what is called a vinyl monomer can be used. The vinyl monomer is a general term of the monomer represented by a general formula (2):

$$CHR^7=CR^8R^9 \qquad (2)$$

(In the formula, $R^7$, $R^8$, and $R^9$ are each a hydrogen atom or an organic group.) Note than the monomer represented by the general formula (1) includes monomers exemplified below.

As the vinyl monomer, styrene and its derivative (phenyl group where $R^7$ and $R^8$ are hydrogen atoms, and $R^9$ may have a substituent); acrylic acid ($R^7$ and $R^8$ are hydrogen atoms, and $R^9$ is a carboxyl group); acrylamide ($R^7$ and $R^8$ are hydrogen atoms, and $R^9$ is a group-$CONH_2$) and its derivative; acrylate (acrylic acid ester or acrylic acid salt); methacrylic acid ($R^7$ is a hydrogen atom, $R^8$ is a methyl group, and $R^9$ is a carboxyl group) (MAA); methacrylamide ($R^7$ is a hydrogen atom, $R^8$ is a methyl group, $R^9$ is a group-$CONH_2$) (MAAm) and its derivative; and methacrylate (methacrylic acid ester or methacrylic acid salt) can be preferably used.

Specific examples of the styrene and its derivative can include styrene (St); o-, m-, or p-methoxystyrene; o-, m-, or p-t-butoxystyrene; o-, m-, or p-chloromethylstyrene; o-, m-, or p-chlorostyrene; o-, m-, or p-hydroxystyrene; o-, m-, or p-styrenesulfonic acid and its derivative; o-, m-, or p-styrenesulfonic acid sodium; o-, m-, or p-styrene boronic acid and its derivative; and the like.

Specific examples of the acrylamide and its derivative can include acrylamide, N-isopropyl acrylamide, N, N-dimethylacrylamide, N-methylol acrylamide, N-hydroxyethyl acrylamide, and the like.

Specific examples of the acrylate can include alkyl acrylate such as methyl acrylate, ethyl acrylate, propyl acrylate, n-butyl acrylate, t-butyl acrylate, hexyl acrylate, 2-ethylhexyl acrylate, n-octyl acrylate, nonyl acrylate, decanyl acrylate, and lauryl acrylate; aryl alkyl acrylate such as benzyl acrylate; tetrahydrofurfuryl acrylate; epoxy alkyl acrylate such as glycidyl acrylate; cycloalkyl acrylate such as cyclohexyl acrylate; alkoxy alkyl acrylate such as 2-methoxyethyl acrylate and butoxyethyl acrylate; hydroxyalkyl acrylate such as 2-hydroxyethyl acrylate and 2-hydroxypropyl acrylate; polyalkylene glycol acrylate such as diethylene glycol acrylate and polyethylene glycol acrylate; alkoxypolyalkylene glycol acrylate such as methoxy tetraethylene glycol acrylate and methoxy polyethylene glycol acrylate; dialkylaminoalkyl acrylate such as 2-(dimethylamino) ethyl acrylate; 3-chloro-2-hydroxypropyl acrylate; 2-hydroxy-3-phenoxypropyl acrylate and the like. Fluoroalkyl acrylate where a fluorine atom is substituted to the alkyl group of alkyl acrylate and a compound where a tris (trialkylsiloxy) silyl group is substituted to the alkyl group of the alkyl acrylate also can be used. An ionic liquid acrylate, such as 2-(N, N-diethyl-N-methyl amino) ethyl acrylate$^+$/trifluorosulfonyliminium ($N(CF_3SO_2)_2^-$) salt, 2-(N-ethyl-N-methyl-N-hydrogenated amino) ethyl acrylate$^+$/trifluorosulfonyliminium ($N(CF_3SO_2)_2^-$) salt, and 1-ethyl-3-methyl imidazolium acrylate$^+$/fluorohydrogenation (($FH)_nF^-$) salt can be used.

Specific examples of the methacrylamide and its derivative can include methacrylamide (MAAm), N-isopropyl methacrylamide, N, N-dimethyl methacrylamide, N-methylol methacrylamide, N-hydroxy ethyl methacrylamide, and the like.

Specific examples of the methacrylate can include alkyl methacrylate such as methyl methacrylate (MMA), ethyl methacrylate, propyl methacrylate, n-butyl methacrylate, t-butyl methacrylate, hexyl methacrylate, 2-ethyl hexyl methacrylate, n-octyl methacrylate, nonyl methacrylate, decanyl methacrylate (LMA), lauryl methacrylate; aryl alkyl methacrylate such as benzyl methacrylate (BzMA); tetrahydrofurfuryl methacrylate; epoxy alkyl methacrylate such as glycidyl methacrylate; cycloalkyl methacrylate such as cyclohexyl methacrylate; alkoxy alkyl methacrylate such as 2-methoxyethyl methacrylate and butoxyethyl methacrylate; hydroxyalkyl methacrylate such as 2-hydroxy ethyl methacrylate (HEMA), 2-hydroxy propyl methacrylate, and glycerin monomethacrylate; polyalkylene glycol methacrylate such as diethylene glycol methacrylate and polyethylene glycol methacrylate; alkoxypolyalkylene glycol methacrylate such as methoxy tetraethylene glycol methacrylate, methoxy polyethylene glycol methacrylate (PEGMA); dialkylaminoalkyl methacrylate such as 2-(dimethylamino) ethyl methacrylate (DMAEMA); alkoxysilyl alkyl methacrylate such as 3-(trimethoxysilyl) propyl methacrylate; 3-chloro-2-hydroxypropyl methacrylate; 2-hydroxy-3-phenoxypropyl methacrylate and the like. A compound, for example: fluoroalkyl methacrylate, such as 2,2,3,4,4,4-hexafluorobutyl methacrylate (HFBMA) where fluorine atom is substituted to the alkyl group of the alkyl methacrylate; and 3-[tris (trimethylsiloxy) silyl] propyl methacrylate (MOPES), where tris (trialkylsiloxy) silyl group is substituted to the alkyl group of the alkyl methacrylate, also can be used. An ionic liquid methacrylate, such as 2-(N, N-diethyl-N-methyl amino) ethyl methacrylate$^+$/trifluorosulfonyliminium ($N(CF_3SO_2)_2^-$) salt, 2-(N-ethyl-N-methyl-N-hydrogenated amino) ethyl methacrylate$^+$/trifluorosulfonyliminium ($N(CF_3SO_2)_2^-$) salt, 1-ethyl-3-methyl imidazolium methacrylate$^+$/fluorohydrogenation (($FH)_nF^-$) salt, and N-ethyl-N-methyl pyrrolidinium methacrylate$^+$/fluorohydrogenation (($FH)_nF^-$) salt, can be used.

In the present invention, even when both $R^8$ and $R^9$ are groups having a carboxyl group or carboxylate, the reaction preferably progresses. Specifically, itaconic acid, such as itaconic acid (ITA), dimethyl itaconate ($Me_2ITA$), and monobutyl itaconate (BuITA), its mono alkyl ester, and its dialkyl ester can be included.

In the present invention, the monomer having two or more double bonds (vinyl group, isopropenyl group, and the like) is also usable. Specifically, for example, a diene-based compound (butadiene, isoprenoid, and the like), a compound having two allyl groups (diallyl phthalate and the like), a compound having two methacryl groups (ethylene glycol dimethacrylate and the like), and a compound having two acrylic groups (ethylene glycol diacrylate and the like) are included.

In the present invention, a vinyl monomer other than the above-described one can be used. Specifically, for example, vinyl esters (such as vinyl acetate, propionic acid vinyl, benzoic acid vinyl), a styrene derivative other than the above-described one (such as α-methylstyrene), vinyl ketones (such as vinyl methyl ketone, vinyl hexyl ketone, methyl isopropenyl ketone), N-vinyl compound (such as N-vinyl pyrrolidone, N-vinyl pyrrole, N-vinyl carbazole, and N-vinyl indole), acrylonitrile (AN), methacrylonitrile, maleic acid and its derivative (such as, maleic anhydride), halogenated vinyls (such as vinyl chloride, vinylidene chloride, tetrachloroethylene, hexachloropropylene, vinyl fluoride), olefins (such as ethylene, propylene, 1 or 2-butene, 1-hexene, and cyclohexene) are included.

These radically polymerizable monomers may be used alone or in combination with two or more. In the use of two or more monomers, they may be simultaneously added at the start of the reaction, or may be sequentially added in association with the progress of the polymerization.

As an example of the organic catalyst, a compound capable of extracting an iodine atom from an iodine compound to generate a carbon radical is included, and the organic catalyst is roughly classified into an organophosphorus compound, an organic nitrogen compound, an organic oxygen compound, an organic sulfur compound, and the like.

The organophosphorus compound is roughly classified into a phosphine compound, a phosphonate compound, a phosphonium salt, a phosphazenium salt, a phosphite compound, and the like.

The phosphine compound includes triethyl phosphine, tributyl phosphine, triphenyl phosphine, and the like; the phosphonate compound includes methylphosphonic acid, ethylphosphonic acid, phenylphosphonic acid, methylphosphonic acid dimethyl ester, methylphosphonic acid diphenyl ester, and the like; the phosphonium salt includes methyltributylphosphonium iodide, tetraphenylphosphonium iodide, and the like; the phosphazenium salt includes hexaphenyl diphosphazenium chloride and the like; and the phosphite compound includes dimethyl phosphite, diethyl phosphite, dibutyl phosphite, diphenyl phosphite, and the like.

The organic nitrogen compound is roughly classified into amines, imides, imidazolium salts, pyridinium salts, ammonium salts, iodinated amines, iodinated imides, and the like.

The amines include triethylamine, tributylamine, tetrakis (dimethylamino) ethylene, 1,4,8,11-tetramethyl-1,4,8,11-tetraazacyclotetradecane, diphenylamine, and the like. The imides include succinimide and the like. The imidazolium salts include 1-methyl-3-methyl-imidazolium iodide, 1-ethyl-3-methylimidazolium bromide, and the like. The pyridinium salts include 2-chloro-1-methyl pyridinium iodide and the like. The ammonium salts include tetrabutyl ammonium iodide, tetrabutyl ammonium triiodide, tetrabutyl ammonium bromodiode, and the like. The iodinated amines include iodinated diphenylamine and the like. The iodinated imides include iodo succinimide, iodinated maleimide, iodo phthalimide, 1,3-diiodo-5,5-dimethylhydantoin, and the like.

The organic oxygen compound is roughly classified into phenols, alcohols, furans, and the like. The phenols include 2,4,6-trimethylphenol, 2,6-di-t-butyl-4-methylphenol, 2,4-dimethylphenol, 2-isopropyl-5-methylphenol, 2,6-di-t-butyl-4-methoxyphenol, 2,6-dimethoxy-4-methylphenol, 2,6-dimethyl-4-cyanophenol, 4-nitrophenol, phenol, vitamin E, hydroquinone, resorcinol, catechol, 4-t-butylcatechol, 2-methoxyhydroquinone, hydroxyhydroquinone, and the like. The alcohols include benzyl alcohol, 1-phenylethyl alcohol, vitamin C, and the like. The furans include furan, oligofuran, polyfuran, and the like.

The organic sulfur compound is roughly classified into thiophenes, sulfonium salts, and the like. The thiophenes include thiophene, oligothiophene, polythiophene, and the like. The sulfonium salts include tributylsulfonium iodide and the like.

The above-described living radical polymerization can be represented by, for example, a chemical formula indicated as the following formula (3).

[Chem. 5]

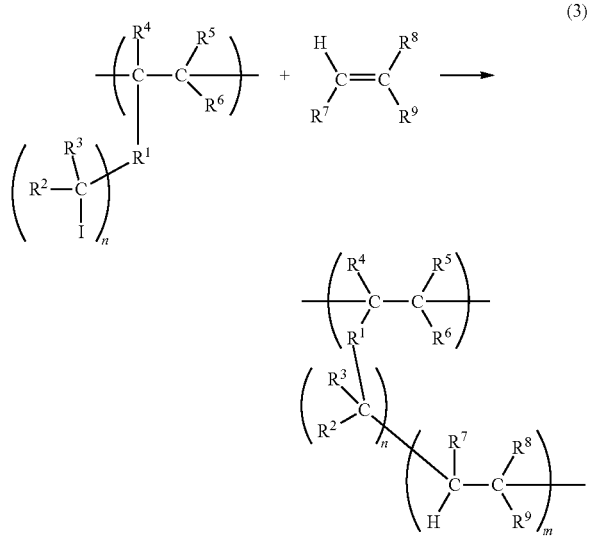

(3)

m=2 to 10000

By reacting a radically polymerizable polymer with the initiator represented by the formula (1) under the organic catalyst, the graft polymer represented by the formula (3) is generated.

The graft polymer to be generated may have a chemical structural formula different from the structure described with the above-described formula (3). Especially, this polymer to be generated may be a homopolymer, or may be a copolymer (copolymer, terpolymer, and the like). The copolymer to be generated may be any of a random copolymer and a block copolymer.

By progressing the living radical polymerization reaction using such a compound represented by the formula (1) as the initiator, the graft polymer can be more stably generated. Especially according to the present invention, since the need for using dangerous peroxides as the initiator and the catalyst in the living radical polymerization is eliminated, the reaction can be safely progressed.

In progressing the living radical polymerization reaction according to the present invention, a reaction temperature is not specifically limited, but preferred to be 0° C. to 180° C., and more preferably, 30° C. to 120° C. This reaction temperature is further preferred to be 40° C. to 80° C. As a reaction time, the reaction time appropriate for each reaction can be chosen as necessary in a range of 30 minutes to 24 hours.

The living radical polymerization reaction according to the present invention may be progressed without a solvent, but the solvent may be used. A reaction solvent in such a case is not especially limited insofar as the reaction is not inhibited, and any solvent may be used. As an example of this reaction solvent, the solvent used in the conventional living radical polymerization may be used as it is. Specifically, for example, water, various alcohols such as ethanol, carbonates such as ethylene carbonate, esters such as butyl acetate, amides such as N,N-dimethyl 2-methoxyethylamide (DMMEA) and dimethylformamide (DMF), and ethers such as diethylene glycol dimethyl ether (diglyme) can be used.

As a reactive condition of the living radical polymerization reaction according to the present invention, the living radical polymerization reaction may be performed under the condition of the presence of air. The reaction may be performed under an inert atmosphere such as nitrogen or argon as necessary.

In the method for manufacturing the graft polymer to which the present invention is applied, an aspect where the polymerization reaction is performed with still another initiator added to a mixture of an iodinated vinyl monomer, in which the structural units having the iodine initiating groups are continuous, as the initiator, the radically polymerizable monomer, and the organic catalyst may be employed.

In this case, as the other initiator, a known radical initiator used for the radical reaction can be used. Examples of such known radical initiators include azo radical initiators, peroxide radical initiators, and the like. Specific examples of the azo radical initiators include azobis (isobutyronitrile) (AIBN), 2,2'-azobis (2,4-dimethylvaleronitrile) (V65), 2,2'-azobis (4-methoxy-2,4-dimethylvaleronitrile) (V70), dimethyl 2,2'-azobis (2-methylpropionate) (V601), 2,2'-azobis (2-methylbutyronitrile) (V59), 1,1'-azobis (cyclohexane-1-carbonitrile) (V40), 2,2'-azobis [N-(2-propenyl)-2-methylpropionamide] (VF096), 2,2'-azobis (N-butyl-2-methylpropionamide)(VAm110). Specific examples of the peroxide radical initiators include benzoyl peroxide, dicumyl peroxide, t-butyl hydroperoxide, t-butyl peroxybenzoate (BPB), di (4-t-butylcyclohexyl) peroxydicarbonate (PERKADOX16), hydrogen peroxide, potassium peroxide disulfate. One of these radical initiators may be used alone, or two or more of these radical initiators may be used in combination.

Of course, the present invention may be embodied as the graft polymer generated based on the formula (3) or the initiator represented by the formula (1).

Especially, when the present invention is embodied as the initiator living-radical-polymerized with the vinyl monomer by the organic catalyst, the recurring units represented by the formula (1) below are included in the main chain.

[Chem. 6]

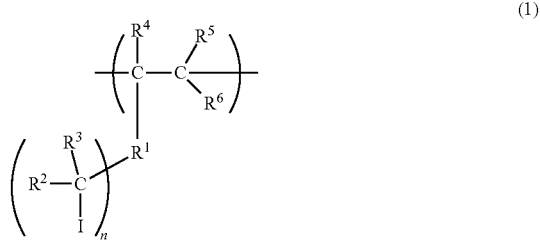

(1)

Here, $R^1$: —COO—$(CH_2)_a$—OCO—
$R^2$, $R^3$, $R^4$, $R^5$, $R^6$: hydrogen atom, aromatic group, aliphatic group
a=2 to 5

$R^1$: linking group (linear, branched, or cyclic alkylene group having 1 to 30 carbon atoms that may contain an ether bond or an ester bond, an aromatic group) may be more preferably represented by a general formula (A) below (in the formula, $Z^1$ and $Z^2$ are oxygen atoms independently of one another), or a general formula (B) below. Here, $R^{10}$ represents a linear, branched, or cyclic alkylene group, and $R^{11}$ represents a hydrogen atom or an aliphatic group.

[Chem. 7]

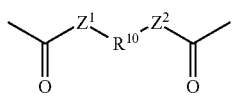 (A)

[Chem. 8]

 (B)

$R^1$: linking group may be embodied as a general formula (C) (in the formula, Ar represents an optionally substituted aromatic group).

[Chem. 9]

—Ar— (C)

The aliphatic group in $R^2$, $R^3$, $R^4$, $R^5$, $R^6$, and $R^{11}$ has an optionally substituted linear or branched alkyl group having 1 to 12 carbon atoms. When the aliphatic group is substituted, the number of substituents is not specifically limited insofar as the substitution is possible, and is one or more.

As the group that may be substituted for the aliphatic group, a halogen atom, an optionally substituted linear or branched alkyl group having 1 to 12 carbon atoms, an optionally substituted aromatic group, an optionally substituted non-aromatic heterocyclic group, a linear or branched alkoxy group having 1 to 12 carbon atoms, a cyano group, a nitro group, or the like is included.

The aromatic groups in $R^2$, $R^3$, $R^4$, $R^5$, $R^6$, and $R^{11}$ include an aromatic hydrocarbon ring group or an aromatic heterocyclic group, and specifically, a phenyl group, a biphenyl group, a terphenyl group, a naphthyl group, a binaphthyl group, an azulenyl group, an anthracenyl group, a phenanthrenyl group, a fulleryl group, a furyl group, a thienyl group, a pyrrolyl group, a pyrazolyl group, a imidazolyl group, an isoxazolyl group, a thiazolyl group, a thiadiazolyl group, a pyridyl group, a benzofuranyl group, an indolyl group, a benzothiazolyl group, a carbazolyl group, and the like are included.

This aromatic group may be substituted, and the number of substituents in this case is not specifically limited insofar as the substitution is possible, and is one or more.

As the group that may be substituted for the aromatic group, a halogen atom, an optionally substituted linear or branched alkyl group having 1 to 12 carbon atoms, an optionally substituted aromatic group, an optionally substituted non-aromatic heterocyclic group, a carboxyl group, a linear or branched alkoxy group having 1 to 12 carbon atoms, a cyano group, a nitro group, or the like is included.

While the following specifically describes the present invention with the working examples, the present invention is not limited to the following working examples. A measuring method of molecular weight distribution in the following working examples is as follows.

[Molecular Weight Distribution Measurement]

A polydispersity index (hereinafter referred to as PDI in short) is a value indicated by PDI=Mw/Mn. Here, Mw is a weight average molecular weight, and Mn is a number average molecular weight. Mn and PDI below are standard polymethyl methacrylate (PMMA) conversion molecular weights obtained by a gel permeation chromatography (GPC; GPC-101, manufactured by Shodex) using a 10 mmol/L lithium bromide N,N-dimethylformamide (DMF) solution or tetrahydrofuran (THF) with an eluate.

A compound in which the recurring unit represented by the formula (1) is Chem. 4 was synthesized. The compound having the recurring unit represented by Chem. 4 in the main chain is hereinafter referred to as PHEMA-EMA-I. The molecular weight of the recurring unit of PHEMA-EMA-I is 357. Before the working examples, a method for manufacturing poly (2-hydroxyethyl methacrylate) (hereinafter referred to as PHEMA in short) as a raw material will be described with a reference example.

[Manufacture of Main Chain Polymer (PHEMA) (Reference Example)]

In a reactor equipped with a stirrer, a thermometer, and a nitrogen inlet tube, 11 pts.mass of diethylene glycol dimethyl ether (hereinafter referred to as DMDG in short), 100 pts.mass of 2-hydroxyethyl methacrylate (hereinafter referred to as HEMA in short), 0.2 pts.mass of iodine, 2.8 pts.mass of tetra n-butyl ammonium iodide (hereinafter referred to as Bu₄NI in short), and 1.5 pts.mass of 2,2'-azobis (4-methoxy-2,4-dimethylvaleronitrile) [product name: V-70 (hereinafter referred to as V-70 in short), manufactured by FUJIFILM Wako Pure Chemical Corporation] as the initiator were added. Then, nitrogen gas was stirred while being introduced, and warmed to 50° C. Polymerization was performed for three hours while maintaining a reaction system at 50° C. The reaction mixture was purified by reprecipitation recovery using hexane as a poor solvent to obtain PHEMA. For the obtained PHEMA, the molecular weight of 10 mmol/L lithium bromide N,N-dimethylformamide solution as its eluent was measured by GPC in polymethyl methacrylate conversion.

The method for manufacturing PHEMA-EMA-I in Working Example 1 and Working Example 2 will be described using PHEMA manufactured based on the above-described reference example as a raw material.

[Chem. 10]

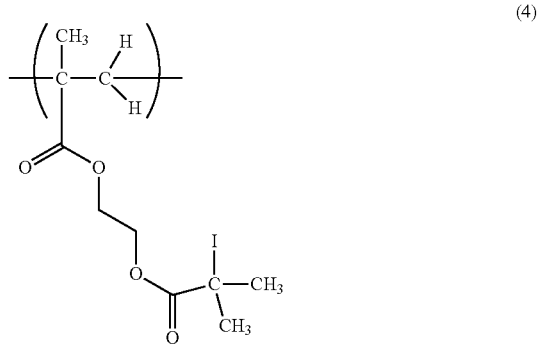 (4)

Working Example 1

[Introduction of Polymerization Initiating Group to Main Chain Polymer (PHEMA) First Method]

After 2 g of PHEMA (Mn=23000, PDI=1.41) and 30 mL of pyridine were added in a reactor equipped with a magnetic stirrer, 17.7 g of 2-bromoisobutyryl bromide was added and stirred at 20° C. for 30 minutes. The reaction mixture was purified by reprecipitation recovery after filtration using water as a poor solvent. Next, the obtained precipitate was weighed to take by 5 g, and 15 mL of acetone and 6.3 g of sodium iodide (hereinafter referred to as NaI in short) were added. Then, stirring was performed under nitrogen atmosphere at 80° C. for 13.5 hours. After filtering sodium bromide to be generated, the reaction mixture was purified by reprecipitation recovery using a 1% by weight sodium bisulfite aqueous solution as the poor solvent to obtain PHEMA-EMA-I by a yield of 3.9 g. In the measurement of the molecular weight by GPC using a THF solvent, Mn was 27000 and PDI was 1.51 in polymethyl methacrylate conversion.

$^1$H-NMR (400 MHz, CDCl$_3$) δ: 4.33 (t, 2H), 4.21 (t, 2H), 2.12 (s, 6H), 2.03 to 1.39 (m, 2H), 1.22 to 0.81 (m, 3H).

Working Example 2

[Introduction of Polymerization Initiating Group to Main Chain Polymer (PHEMA) Second Method]

After 200 mL of methylene chloride, 20.8 g of PHEMA (Mn=17400, PDI=1.73), and 15.8 g of pyridine were added in a reactor equipped with a magnetic stirrer, a mixture of 44.1 g of 2-bromoisobutyryl bromide and 50 mL of methylene chloride was added and stirred for 30 minutes. The reaction mixture was purified by reprecipitation recovery after filtration using methanol as a poor solvent. Next, the obtained precipitate was weighed to take by 20 g after drying, and 140 mL of acetonitrile and 32.2 g of NaI were added. Then, stirring was performed under nitrogen atmosphere at 80° C. for 17 hours. After filtering sodium bromide to be generated, the reaction mixture was purified by reprecipitation recovery using methanol as the poor solvent to obtain PHEMA-EMA-I by a yield of 20.3 g. In the measurement of the molecular weight by GPC using THF solvent, Mn was 50000 and PDI was 1.4 in polymethyl methacrylate conversion.

$^1$H-NMR (400 MHz, CDCl$_3$) δ: 4.33 (t, 2H), 4.18 (t, 2H), 2.10 (s, 6H), 2.03 to 1.58 (m, 2H), 1.52 to 0.62 (m, 3H).

Working Example 3

Working Example 3 describes a method for manufacturing the graft polymer based on the PHEMA-EMA-I into which the polymerization initiating group is introduced.

[Manufacture of Graft Polymer]

7.1534 g of hexyl methacrylate (HMA) as a monomer, 0.300 g of PHEMA-EMA-I (Mn=27000, PDI=1.51) as an alkyl iodide, 0.1522 g of tetrabutyl ammonium iodide (hereinafter referred to as Bu$_4$NI in short) as a catalyst, and 4.9689 g of diethylene glycol dimethyl ether (hereinafter referred to as DMDG in short) as a solvent were mixed in a 100 mL eggplant flask, remaining oxygen was replaced with argon, and this reaction solution was heated to 80° C. to perform the polymerization reaction. The reaction time was 6 hours. A high performance liquid chromatography (HPLC) provided a polymerization rate of the monomer 44%. In the measurement of the molecular weight by GPC using the THF solvent, Mn was 300000 and PDI was 3.3 in polymethyl methacrylate conversion.

The invention claimed is:

1. A method for manufacturing a graft polymer, the method comprising performing a living radical polymerization of a vinyl monomer by a compound and an organic catalyst to manufacture the graft polymer, the compound having a recurring unit represented by formula (1) below in a main chain:

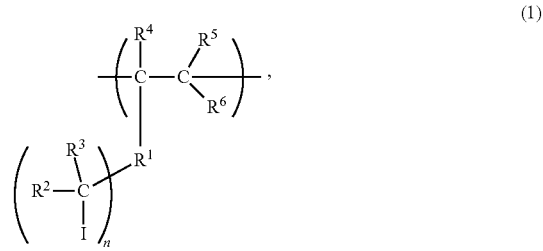

where:
n=1,
R$^1$ is —COO—(CH$_2$)$_a$—OCO—,
R$^2$ is an aromatic group or an aliphatic group,
R$^3$ is an aromatic group or an aliphatic group,
R$^4$ is a hydrogen atom or an aliphatic group,
R$^5$ is a hydrogen atom or an aliphatic group,
R$^6$ is a hydrogen atom or an aliphatic group, and
a=2 to 5.

2. The method for manufacturing a graft polymer according to claim 1, wherein the living radical polymerization is performed with the organic catalyst containing any of an amine compound, a phosphine compound, a phosphonate compound, a phosphonium salt, an iodoimido compound, or an ammonium compound.

3. An initiator of a graft polymer, the initiator of the graft polymer having a recurring unit represented by formula (1) below in a main chain:

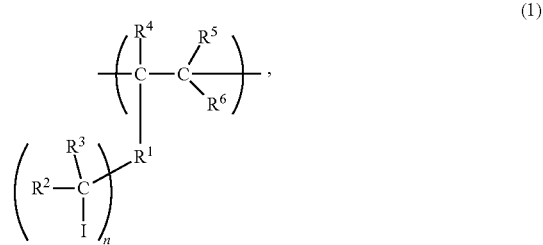

where:
n=1,
R$^1$ is —COO—(CH$_2$)$_a$—OCO—,
R$^2$ is an aromatic group or an aliphatic group,
R$^3$ is an aromatic group or an aliphatic group,
R$^4$ is a hydrogen atom or an aliphatic group,
R$^5$ is a hydrogen atom or an aliphatic group,
R$^6$ is a hydrogen atom or an aliphatic group, and
a=2 to 5.

4. The method for manufacturing a graft polymer according to claim 1, wherein the living radical polymerization is performed with the organic catalyst containing any of a phosphine compound, a phosphonate compound, a phosphonium salt, an iodoimido compound, or an ammonium compound.

5. The method for manufacturing a graft polymer according to claim 1, wherein the organic catalyst is tetrabutyl ammonium iodide.

6. The method for manufacturing a graft polymer according to claim 1, wherein the organic catalyst is a compound capable of extracting an iodine atom from an iodine compound to generate a carbon radical.

* * * * *